Nov. 22, 1966 P. S. LITT 3,287,170
VOLTAIC CELL HAVING A SILVER OXIDE POSITIVE ELECTRODE
AND A MANGANESE NEGATIVE ELECTRODE
Filed June 29, 1962

INVENTOR.
PETER S. LITT
BY
ATT'Y.

United States Patent Office 3,287,170
Patented Nov. 22, 1966

3,287,170
VOLTAIC CELL HAVING A SILVER OXIDE POSITIVE ELECTRODE AND A MANGANESE NEGATIVE ELECTRODE
Peter S. Litt, Albuquerque, N. Mex., assignor of twelve percent each to Walter B. Hobbs, Ralph K. Ball, and Watson D. Harbaugh, all of Evanston, Ill.
Filed June 29, 1962, Ser. No. 207,161
2 Claims. (Cl. 136—100)

The present invention relates to a voltaic cell, which is sometimes referred to as a single or one-time use battery, a group of which can be connected serially for high voltage or in parallel for high amperage.

In the use of batteries under varying weather and temperature conditions conventional batteries of themselves generally have little if any power output in the sub-zero weather experienced in some places on the earth. Moreover, some batteries which will operate with some success at low temperatures are confronted with vapor pressures which are undesirable at other places on the earth having high temperatures, and, some batteries successful at high temperatures have been considered to be inoperative in sub-zero temperatures.

One of the objects of the invention is to provide a battery which by itself is operable throughout the range of temperature variations experienced on the earth's surface.

Another object is to provide a battery which employs water as a liquid medium, yet will operate at temperatures as high as 140° F. and without freezing at temperatures as low as —70° F.

Another object of the invention is to provide a battery which may be started in its generation of power whenever an electric load is applied and will shut down for another later start when the load is removed at temperatures well below 0° F.

Another object of the invention is to provide a source of standby electric power at sub-zero temperatures which does not radiate electrical "noise" and does not adversely affect equipment powered by it when generating electricity.

Another object is to provide a battery in which any one of a number of electrolytes, both wet and dry, may be used which are composed essentially of compounds such as calcium sulphate ($CaSO_4 \cdot 2H_2O$) and aluminum sulphate $Al_2(SO_4)_3 \cdot 9H_2O$ or compounds of other elements which dissociate freely in relative proportions in water or other solutions, yet deliver approximately the same current flow potential as hydrogen sulphate does in a lead acid battery.

Another object is to provide a cell which is packed with a powdered electrolyte having its own water in crystalline form and which is wetted with a solution which does not freeze over deep freezing ranges, but dissociates the electrolyte to release the crystalline water as pure water for further dissociation when current is being drawn.

The invention provides a voltaic cell which is inexpensive to manufacture, reliable in its operation, and easy to activate after long periods of storage or inactivity in both high or low temperatures.

Other objects of the invention will be appreciated from the description of the drawings in which several embodiments of the invention are illustrated schematically:

Figure 1:
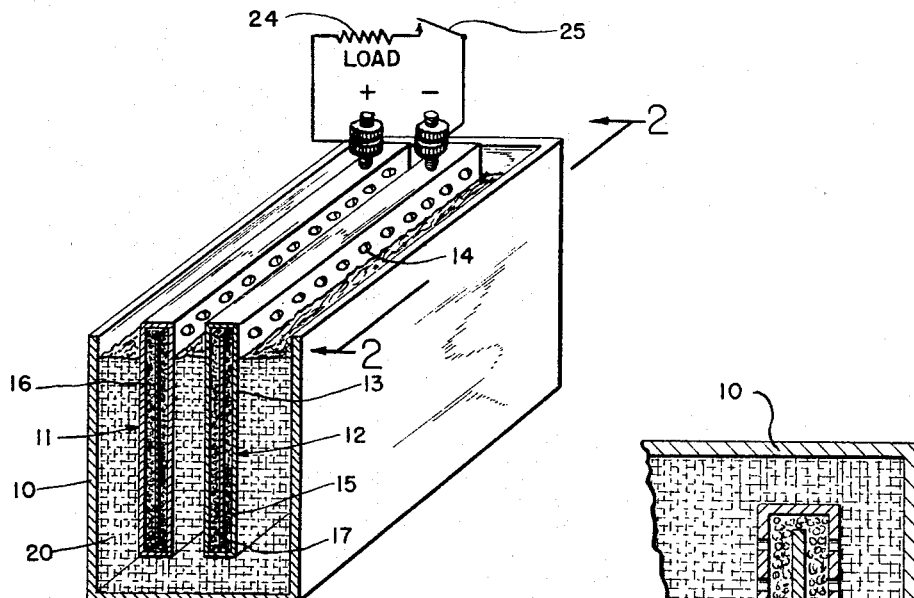
FIG. 1 is a perspective diagrammatical view partly in section of a cell arrangement embodying the invention.
Figure 2:
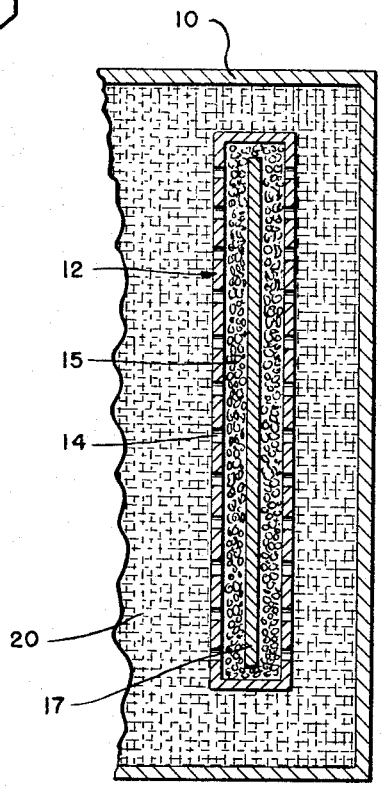
FIG. 2 is an enlarged section taken on the line 2—2 in FIG. 1.

Referring to the drawing, a container 10, preferably made of an inert material such as a plastic, a compound of gilsonite or a solid hydrocarbon, etc., is shown in FIGS. 1 and 2.

Two electrodes are shown, the positive one identified at 11 being of silver oxide and the negative one identified at 12, being treated with or made of manganese.

Although the electrodes may be made solid, it is preferred to form them in the shape of wells 13 that are narrow in one cross-sectional dimension with the walls foraminated as at 14 to permit movement of ions therethrough. The material of the walls may be of an inert or plastic material. The wells are filled with a felt 15 that is impregnated with either the silver oxide for the one electrode and granulated or powdered metallic manganese for the other. It is preferred that a foil strip 16 of silver be provided as an electrical collector for current developed in the silver oxide in the felt 15, while a thin conductive member 17 can also be embedded in the felt 15 of the negative pole 12.

Figure 3:
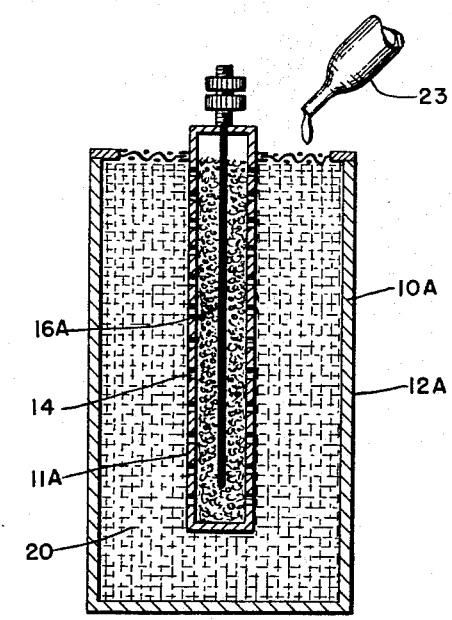
FIG. 3 is a sectional view of another embodiment of the invention illustrated diagrammatically.

In FIG. 3 is shown a construction in which the negative electrode 12A can also serve as a housing 10A. It can be made of manganese which is formed as a container and externally insulated or protected, if desired, by a dielectric coating.

The electrolyte 20 may be aluminum sulphate but preferably is a calcium sulphate and can either be a slurry (water) for high temperature operation or it can be a dry powder for extra low temperature operation. In either instance, it is to be noted that to the extent that the sulphate is taken into solution, it dissociates into two ions and, to the extent that dissociation occurs, the water of crystallization in $CaSO_4 \cdot 2H_2O$ or $Al_2(SO_4)_3 \cdot 9H_2O$ is released.

In those instances where a dry electrolyte is employed, as in extra low temperatures, operation of the dry electrolyte can be started by a few drops from a source such as an eye-dropper 23 containing a liquid such as water or pyridine, which freezes below —220° F. This is introduced to release the crystalline water at a rate which avoids freezing, while being adequate to carry on the necessary reactions for the delivery of potential. In brief, the few drops are needed to begin a reaction that releases the water of crystallization at a rate needed for a succession of reactions.

The $SO_4^{--}$ ions react with the silver oxide to form silver sulphate and release $O_2$ and in so doing release voltaic energy identified as having a "positive" polarity. Electrical current travels through the load of external impedance 24, when switch 25 is closed, to the manganese electrode 12 which reacts with the $Ca^{++}$ or $2Al^{+++}$ ions to form manganates of calcium or aluminum, as the case may be.

Heretofore, the reaction of the positive ions with other metals coats the metal with an insulating film which increases the internal resistance of the cell, but I have found that with manganese the positive ion compound precipitates and moves away from the manganese electrode, thereby keeping the manganese electrode clean to react with further positive ions with low internal resistance effects and without the use of a de-polarizing compound or purging current cycle.

Current generation does not begin until an external load is applied and it stops when the load is removed. With the use of a dry electrolyte, there is present approximately 20% and 32% of crystalline water in the case of the calcium and aluminum sulphates, respectively, which never freezes, yet this water of crystallization is released during the chemical reaction, once it is started, and it continues without freezing as long as current is consumed. Once the load is removed, any free water present might harmlessly freeze and the battery then remains inactive until reactivated with a few drops of liquid.

Such a liquid for activating a dry electrolyte includes water, a dilute sulphuric acid solution or pyridine, and when activated or reactivated the battery can again be used to supply current until the next shutdown. Pyridine is preferred for extremely cold locations because it can be added anytime and remains to start a reaction as soon as current begins to flow. Even when shut down, the pyridine is ready to reactivate the cell the next time current is drawn.

In some respects I am not able to account fully for the improved results which are obtained by the method and apparatus of this invention, and it should be understood that any attempt to analyze the theory which is believed to be responsible for these results is to be construed not as defining a mode of operation, but merely as a possible explanation of certain physical, electrical or chemical phenomena which have been observed.

Having thus described the invention and various embodiments thereof, it will be appreciated by those skilled in the art how the objects and operation of the invention set forth herein are fulfilled and accomplished and how various and further embodiments and modifications can be made without departing from the spirit of the invention, the scope of which is commensurate with the appended claims.

What is claimed is:
1. A voltaic cell comprising:
a silver oxide electrode,
a manganese electrode,
and an electrolyte selected from the group consisting of $CaSO_4 \cdot 2H_2O$ and $Al_2(SO_4)_3 \cdot 9H_2O$, said electrolyte being in the form of a water slurry.

2. A voltaic cell comprising:
a silver oxide electrode,
a manganese electrode,
a dry powdered electrolyte selected from the group consisting of $CaSO_4 \cdot 2H_2O$ and $Al_2(SO_4)_3 \cdot 9H_2O$,
and means for wetting said electrolyte with a liquid selected from the group consisting of water, pyridine and a dilute solution of sulphuric acid to release the water of crystallization therefrom.

References Cited by the Examiner
UNITED STATES PATENTS

| | | | |
|---|---|---|---|
| 2,564,495 | 8/1951 | Mullen | 136—100 X |
| 2,650,947 | 9/1953 | Dunham. | |
| 2,937,219 | 5/1960 | Minnick et al. | 136—100 X |
| 2,970,180 | 1/1961 | Urry | 136—90 |
| 2,980,749 | 4/1961 | Broers | 136—86 |
| 3,067,275 | 12/1962 | Solomon | 136—153 |

FOREIGN PATENTS

| | | |
|---|---|---|
| 352,768 | 7/1931 | Great Britain. |

WINSTON A. DOUGLAS, *Primary Examiner.*

MURRAY TILLMAN, *Examiner.*

B. J. OHLENDORF, *Assistant Examiner.*